May 19, 1942.            L. W. SHAFER            2,283,233
FISHING APPLIANCE
Filed April 7, 1941

Inventor,
Lewis W. Shafer,
by Walter P. Geyer
Attorney.

Patented May 19, 1942

2,283,233

UNITED STATES PATENT OFFICE 2,283,233

FISHING APPLIANCE

Lewis W. Shafer, Buffalo, N. Y.

Application April 7, 1941, Serial No. 387,160

5 Claims. (Cl. 43—16)

This invention relates generally to improvements in fishing appliances but more particularly to a tip-up device designed for attachment to boats, docks, etc.

It has for one of its objects to provide a tip-up fishing appliance which is simple and inexpensive in construction, which may be readily applied to and removed from a given place of attachment, and which is very effective in operation.

Another object of the invention is to provide a device of this character wherein the tip-up arm is designed to function as a holder or retainer for the fishing line when not in use, or for that portion thereof not being used at a given time.

Other features in the invention reside in the construction and arrangement of parts hereinafter described and particularly pointed out in the appended claims.

Figure 1:
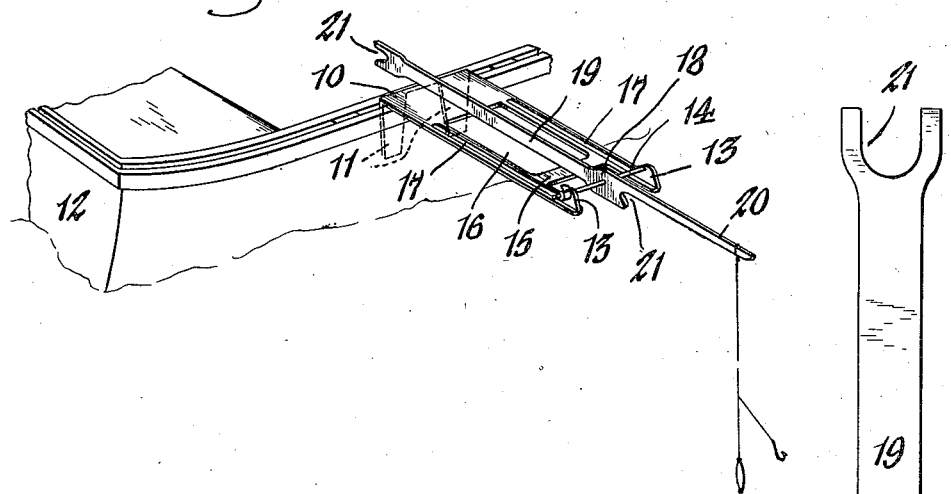
Figure 2:
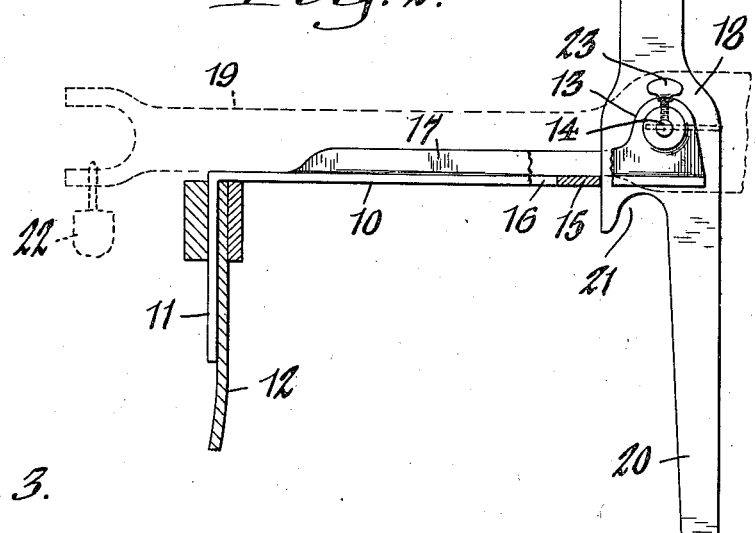
Figure 3:
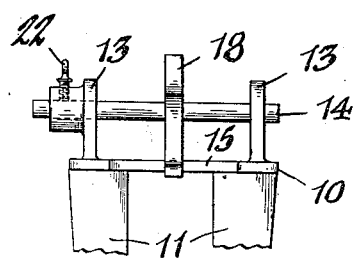

In the accompanying drawing:

Figure 1 is a perspective view of any improved fishing appliance showing the same in position on a boat. Figure 2 is an enlarged side view thereof, partly in section, showing the tip-up arm in its upright or fish-catching position. Figure 3 is an enlarged front view of the device.

Similar characters of reference indicate corresponding parts throughout the several views.

By way of example, I have shown my improved fishing appliance as applied to a boat, and as extending from one side thereof where it is free from interference with the occupants of the boat, yet accessible for the fishing operations. In its preferred construction, this device consists of a supporting bracket made of any suitable material, such as cast aluminum, including a horizontal or base portion 10 and depending anchoring lugs 11 at its rear end which are adapted to be inserted and suitably anchored to the gunwale of the boat 12, whereby the base portion of the bracket projects beyond the side of the boat. At its outer or front end this bracket is provided adjacent its side edges with laterally spaced upstanding lugs 13 for receiving a horizontal pivot rod 14.

To the rear of these pivot lugs the base portion of the bracket is provided with a cross bar 15, while the remaining portion thereof may be provided with an opening 16. If desired, the top side of the bracket may be provided along its top side with ribs 17 which merge into the lugs 13 and serve to strengthen the bracket along its marginal edges.

Mounted on the rod 14 to swing in a vertical plane is a tip-up arm, indicated generally by the numeral 18, which not only serves as an indicator when a fish has been hooked on the line suspended from it, but which also forms a holder for the fish line being used. To this end, the tip-up arm includes a shank 19 and a forward extension 20, the former having notches 21 adjacent its opposite ends about which the fishing line is adapted to be wrapped, and the extension or over-hanging portion of the arm constituting a hanger from which the fish line is suspended, in the manner shown in Figure 1. In this connection, after a sufficient length of line has been unwound from the holder it is looped about the extension 20 in the form of a noose, and after one is through fishing this noose can be unfastened and the used portion of the line wrapped about the holder 19.

When the tip-up arm is tipped from its horizontal position shown in Figure 1 or by dotted lines in Figure 2 to its vertical position shown by full lines in Figure 2, indicating that a fish has been caught, the adjoining bottom edge of the arm smartly abuts against the bracket cross bar 15 to limit the movement of the arm to the position shown and automatically set the hook in the mouth of the fish so that the catch will not be lost.

In practice, the rear end of the tip-up arm may be provided with a counter-weight 22 to thereby counter-balance the weight of the line suspended from the arm and render the arm sensitive to tipping upwardly when a fish has been caught. Instead of using a counter-weight, however, the tip-up arm 19 may be pinned to the pivot rod 14 and an adjusting screw 23 provided for engaging and frictionally holding the pivot rod relative to the pivot lugs 13 and thereby the tip-up arm in a given counter-balanced position. This counter-balancing is effected by adjusting the screw more or less against the side of the pivot rod.

I claim as my invention:

1. A fishing appliance of the character described, comprising a bracket having means thereon for anchoring it in an operative position overhanging a body of water, and a vertically-swinging tip-up arm fulcrumed intermediate its ends to said bracket, that portion of the arm forwardly of its fulcrum constituting a support for the suspended fish line, the remaining portion of said arm being notched at its opposite ends and constituting a retainer about which the line is adapted to be reeled when not in use.

2. A fishing appliance of the character described, comprising a bracket including a horizontal portion terminating at one end in anchoring lugs for attaching the bracket in overhanging relation to a boat or the like and provided at its opposite end with pivot-receiving lugs, a horizontal pivot removably fitted in said lugs, a vertically-swinging tip-up arm applied to said pivot and having a portion extending forwardly therefrom for attaching a fish line, and a member formed on said bracket rearwardly of said pivot-lugs and in the swinging path of movement of said tip-up arm for limiting its swinging beyond a predetermined position.

3. A fishing appliance of the character described, comprising a bracket including a horizontal portion terminating at its rear end in depending anchoring lugs and at its front end in laterally-spaced upstanding pivot-lugs, said bracket having a cross bar thereon immediately rearwardly of and below said pivot-lugs, and a tip-up arm fulcrumed on said pivot-lugs to swing vertically relatively to said bracket and adapted to abut said cross bar when assuming a substantially upright position.

4. A fishing appliance of the character described, comprising a bracket including a horizontal portion terminating at one end in anchoring lugs for attaching the bracket in overhanging relation to a boat or the like and provided at its opposite end with pivot-receiving lugs, a horizontal pivot removably fitted in said lugs, a vertically-swinging tip-up arm fixed on said pivot, and an adjusting screw applied to one of said pivot-lugs and engageable with said pivot for frictionally resisting its turning in said lugs.

5. A tip-up arm for use in fishing, comprising a shank having a pivot rod disposed transversely thereof and having notches at its opposite ends and about which a fish line is adapted to be reeled, and an extension forwardly of said shank in overhanging relation to the companion front notch thereof and from which the fish line is adapted to be suspended.

LEWIS W. SHAFER.